United States Patent
Cole et al.

(10) Patent No.: US 6,627,907 B1
(45) Date of Patent: Sep. 30, 2003

(54) INFRARED SCENE PROJECTOR WITH CURRENT-MIRROR CONTROL ELECTRONICS

(75) Inventors: Barrett E. Cole, Bloomington, MN (US); William J. Johnson, Hopkins, MN (US)

(73) Assignee: Honeywell International Inc., Morristown, NJ (US)

( * ) Notice: Subject to any disclaimer, the term of this patent is extended or adjusted under 35 U.S.C. 154(b) by 389 days.

(21) Appl. No.: 09/675,750

(22) Filed: Sep. 29, 2000

(51) Int. Cl.[7] .................................... G01J 1/00
(52) U.S. Cl. .................. 250/495.1; 250/504 R
(58) Field of Search ............... 250/495.1, 330, 250/455.11, 493.1, 504 R, 334

(56) References Cited

U.S. PATENT DOCUMENTS

| | | | |
|---|---|---|---|
| 4,530,010 A | 7/1985 | Billingsley | 358/231 |
| 5,012,112 A | 4/1991 | Flint et al. | 250/493.1 |
| 5,457,493 A | 10/1995 | Leddy et al. | 348/164 |
| 5,508,841 A | 4/1996 | Lin et al. | 359/318 |
| 5,600,148 A | 2/1997 | Cole et al. | 250/495.1 |
| 5,838,015 A | 11/1998 | Burdick et al. | 250/504 R |
| 5,864,144 A | 1/1999 | Laine | 250/504 R |
| 5,926,279 A | 7/1999 | Bijl et al. | 356/388 |
| 5,949,081 A | 9/1999 | Ashley et al. | 250/493.1 |
| 5,973,383 A | * 10/1999 | Cole et al. | 257/536 |

FOREIGN PATENT DOCUMENTS

WO    WO9621248 A    7/1996

OTHER PUBLICATIONS

Cole, B., et al., "Innovations in IR Projector Arrays", *vol. # 4027, Technologies for Synthetic Environments: Hardward–in–the–Loop Testing V*, Robert Lee Murrer, Jr., Air Force Research Lab., ( 4027–37) 56., pp. 1–19 (Apr. 2000).

Offord, B., et al., "Scaled CMOS MEMS for real time infrared scene generation", *vol. # 4027, Technologies for Synthetic Environments: Hardward–in–the–Loop Testing V*, Robert Lee Murrer, Jr., Air Force Research Lab., (4027–10) 52., pp. 1–8, (Apr. 2000).

Prtichard, A.P., et al., "Design and fabrication progress in BAe's high complexity Resistor Array IR Scene Projector devices", *SPIE Conference on Technologies for Synthetic environments: Hardware–in–the–Loop Testing III*, Orlando, Florida. SPIE vol. 3368, pp. 71–77, (Apr., 1998).

Parameswaran M et al. "Integrated CMOS Transducers for Thermal Scene Generation" Microelectronics Journal, MacKintosh Pub. Ltd., vol. 23, No. 6, Sep. 1, 1992.

Driggers R G et al., "Review of Infrared Scene Projector Technology—1993" Optical Engineering, Soc. Of PhotoOptical Instrumentation Engineers vol. 33, No. 7, Jul. 1, 1994.

* cited by examiner

*Primary Examiner*—John R. Lee
*Assistant Examiner*—Christopher M. Kalivoda
(74) *Attorney, Agent, or Firm*—Kris T. Fredrick

(57) ABSTRACT

Infrared scene projectors are useful in testing infrared surveillance and guidance equipment which identify and track objects, such as enemy missiles, based on their infrared emissions or heat-generation characteristics. Infrared scene projectors typically include a thermal pixel array which converts electrical input signals into a desired thermal or infrared image. One problem with conventional thermal pixel arrays is that each pixel has a unique ground voltage based on its point of connection to a ground terminal running through the array, making it difficult to precisely control the pixels. Accordingly, the present inventors devised not only innovative infrared pixel arrays and related control methods, but also infrared scene projectors incorporating them. In one exemplary pixel array, each pixel includes a resistor and a current-mirror circuit which enables control. Operating the array entails receiving a pixel-control voltage, converting the pixel-control voltage to a current, and then coupling the current to the current-mirror circuit in one of the pixels. The current mirror applies an appropriate control current to the resistor and thus enables operation of the pixel independent of ground-voltage variations.

37 Claims, 2 Drawing Sheets

INFRARED SCENE PROJECTOR WITH CURRENT-MIRROR CONTROL ELECTRONICS

The government may have rights in this invention pursuant to contract No. F08630-96-C-0090

TECHNICAL FIELD

The present invention concerns image or scene projection arrays, particularly infrared scene projectors and related control electronics.

BACKGROUND OF THE INVENTION

Analogous to digital slide projectors, scene projectors are devices that generate images based on input electrical signals. Infrared scene projectors, a particular class of scene projectors, generate images in the infrared portion of the electromagnetic energy spectrum. These type scene projectors are useful in testing infrared surveillance and guidance equipment which identify and track objects, such as enemy missiles, based on their infrared emissions or heat-generation characteristics.

Infrared scene projectors typically include a thermal pixel array which converts electrical input signals into a desired thermal or infrared image. The thermal pixel array is typically a rectangular array of hundreds of interconnected infrared pixels, with each pixel having a unique row and column position in the array. Each pixel, which includes a pixel control transistor and a resistor coupled between positive and ground voltage terminals, converts an electrical input voltage into a corresponding amount of heat, or thermal energy, based on the magnitude of the input voltage. Thus, by precisely controlling the input voltage, one controls the infrared emission of each pixel and thus defines an infrared image with desired characteristics.

One problem with conventional infrared scene projectors concerns how precisely one can specify the infrared emission at each pixel in typical thermal pixel arrays. In particular, thermal pixels arrays operate with large electric currents. As these large currents flow through the ground terminal (ground bus) which is distributed throughout the array, large voltages (based on the electrical resistance of the ground terminal and the current magnitude) develop at various points along the ground terminal, meaning that the ideally constant ground voltage actually varies from point to point on the ground terminal and therefore from pixel to pixel. Thus, each pixel has a unique ground voltage based on its point of connection to the ground terminal. This means, for example, that applying the same pixel control voltage to two pixels in the array would not produce two identical infrared emissions as desired, but would instead produce two significantly different infrared emissions based on the unique ground voltages of the pixels.

Conventionally, there have been two approaches for addressing this problem. One approach entails estimating the ground voltage at each pixel and adjusting the pixel control voltage for each pixel to account for its specific ground voltage. The other approach entails biasing each pixel control transistor to operate in its saturation region and minimizing resistance of the ground bus, so that the pixels are less sensitive to ground voltage. However, neither approach has been completely successful in overcoming the ground-variance problem, since with identical pixel control voltages, pixel brightness still varies significantly across infrared pixel arrays.

Accordingly, there remains a need for better solutions to the ground-variance problem in infrared pixel arrays.

SUMMARY OF INVENTION

To address this and other problems, the present inventors devised not only innovative infrared pixel arrays and related control methods, but also infrared scene projector incorporating them. One exemplary infrared pixel array includes two or more pixels, with each pixel including a resistor and its own current-mirror circuit. A related control method entails receiving a pixel-control voltage, converting the pixel-control voltage to a current, and then coupling the current to the current-mirror circuit in one of the pixels. The current mirror applies an appropriate control current to the resistor and thus enables operation of the pixel independent of ground-voltage variations.

DESCRIPTION OF THE PREFERRED EMBODIMENTS

Figure 1:
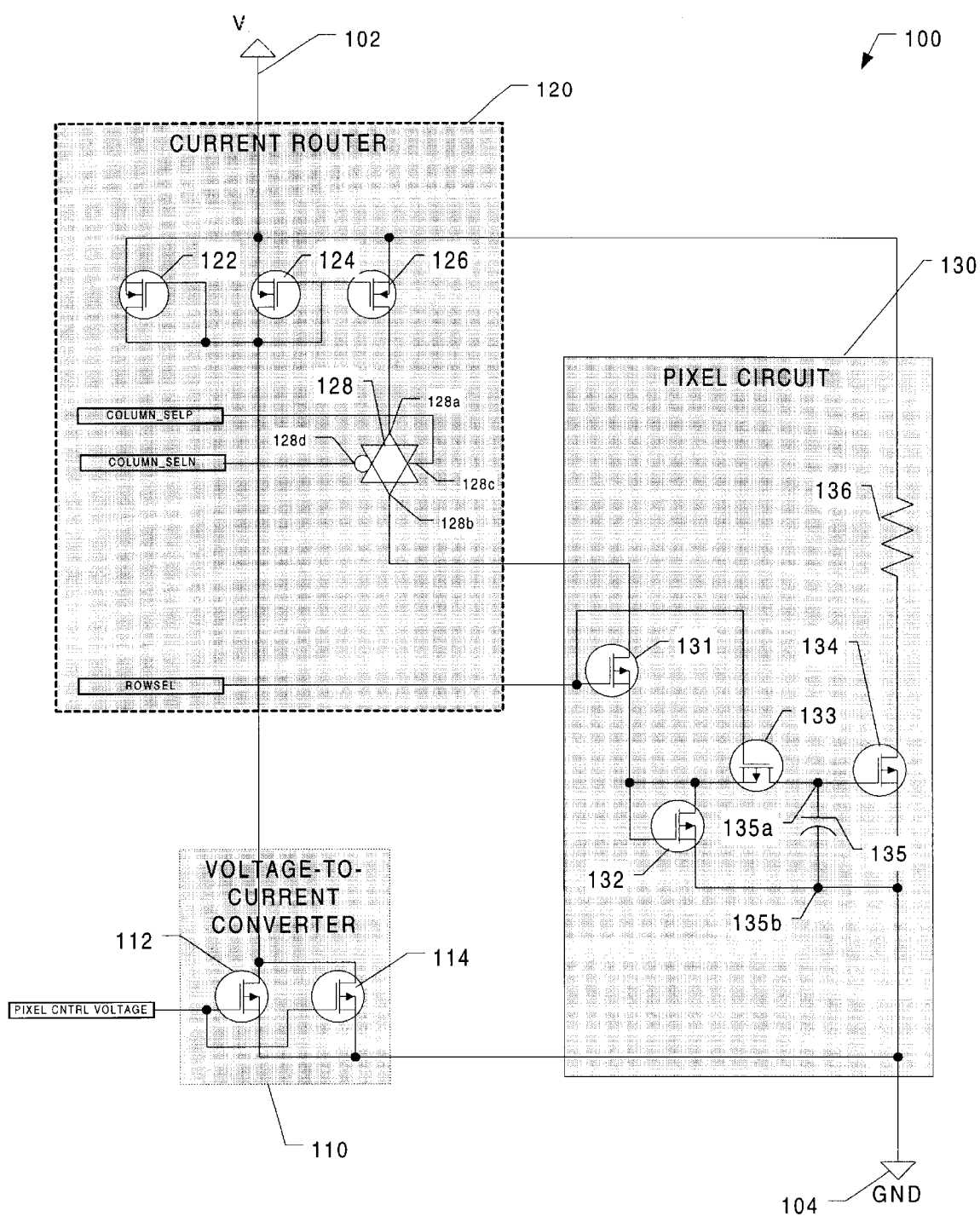
FIG. 1 is a partial schematic diagram of an exemplary thermal pixel array 100 incorporating teachings of the present invention.
Figure 2:
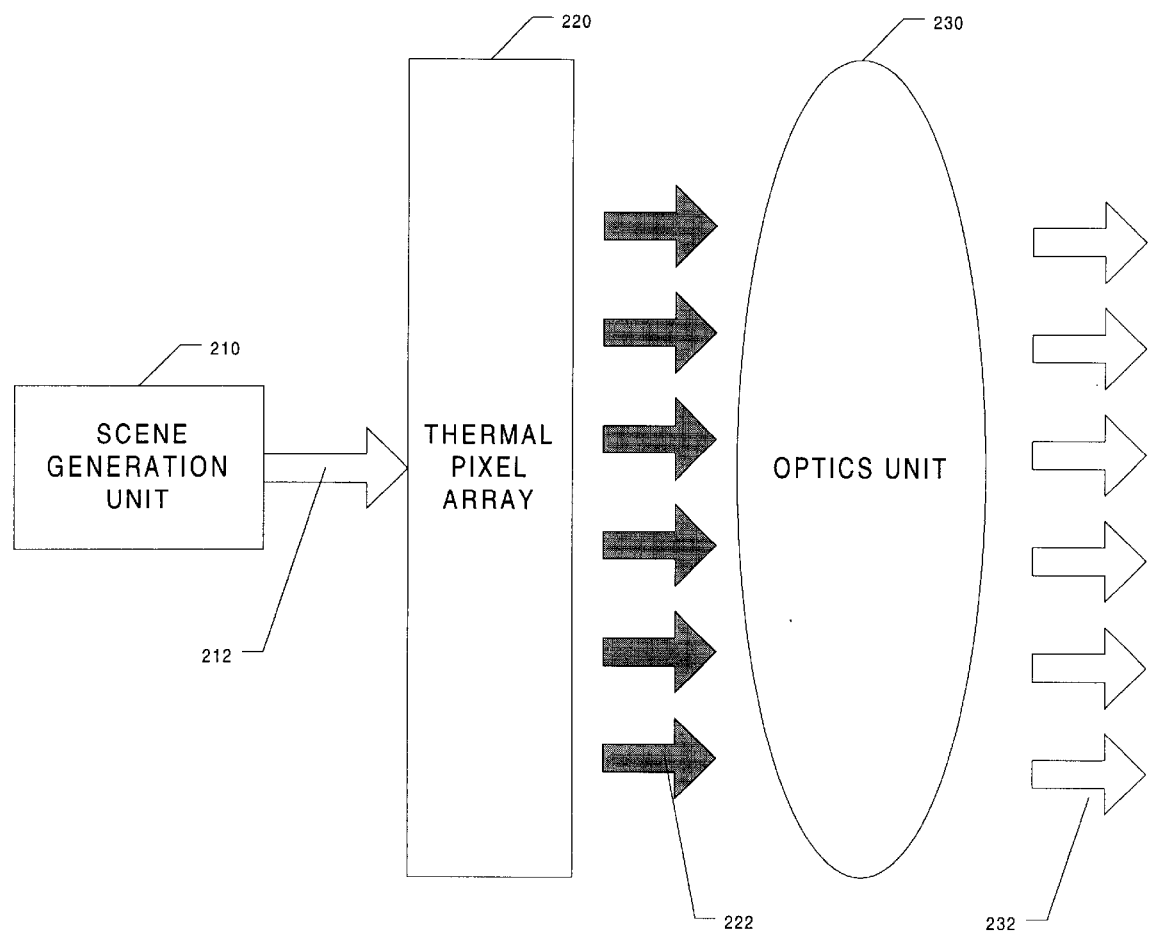
FIG. 2 is a block diagram of an exemplary infrared scene projector 200 incorporating teachings of the present invention.

The following detailed description, which references and incorporates FIGS. 1 and 2, describes and illustrates one or more specific embodiments of the invention. These embodiments, offered not to limit but only to exemplify and teach, are shown and described in sufficient detail to enable those skilled in the art to implement or practice the invention. Thus, where appropriate to avoid obscuring the invention, the description may omit certain information known to those of skill in the art.

FIG. 1 shows a representative portion of an exemplary thermal pixel array 100 incorporating teachings of the present invention. (For clarity, the figure omits conventional features, such as row-select logic, column-select logic, timing-and-control circuitry, and analog-to-digital converters.) In addition to respective supply nodes 102 and 104 and a pixel-control-voltage input, a row-select input, and a pair of complementary column-select inputs, array 100 includes at least one input voltage-to-current converter 110, at least one current router 120, at least one pixel circuit 130.

In general operation, voltage-to-current converter 110 receives a pixel-control voltage at the pixel-control-voltage input and outputs a pixel-control current Icontrol, based on the pixel-control voltage to current router 120. Current router 120, which is located outside of pixel circuit 130 in the exemplary embodiment, routes current Icontrol, or more precisely a control current Icontrol' derived from current Icontrol, to a particular pixel circuit, such as pixel circuit 130. Pixel circuit 130 receives the current Icontrol' and produces a corresponding thermal emission, which is independent of the ground voltage at the pixel. (In some embodiments, two or more pixel circuits share the same address and are operated currently based on the same control voltage and control current.)

More particularly, voltage-to-current converter 110 includes two n-channel mosfets (metal-oxide-semiconductor field-effect transistors) 112 and 114, each having three nodes or regions: a control region, called a gate, and two controlled regions, one called a source and the other called a drain. (This description refers to specific nodes or regions of transistor using the name of the node followed by the reference numeral of the transistor itself. For example, mosfet 112 includes a gate 112, a source 112, and a drain 112. For clarity, the drawings omit these additional reference numbers.) Mosfets 112 and 114, both of which have channels with length-to-width ratios of 10:20, are connected in parallel, that is, with gates 112 and 114 connected together, drains 112 and 114 connected together, and sources 112 and 114 connected together. Sources 112 and 114 are additionally connected to ground node 104. The connection of gates 112 and 114 forms the pixel-control-voltage input, and the connection of drains 112 and 114 forms a converter output through which the converter outputs pixel-control current Icontrol to current router 120.

Current router 120 exemplarily includes three p-channel mosfets 122, 124, and 126 and a transmission gate 128. Mosfets 122, 124, and 126, all of which have channels with an exemplary length-to-width ratio of 60:5, constitute a two-to-one current mirror, with sources 122, 124, and 126 connected to positive supply node 102, and with gates 122 and 124 connected together and to drains 122 and 124. (Though the exemplary embodiment uses a two-to-one current mirror, other embodiments use current mirror with lower or higher gains.) Gate 126 connects to drain 124, and drain 126 connects to an input 128a of transmission gate 128. Transmission gate 128 has complementary control nodes 128d and 128c which are coupled respectively to the negative column-select input and the positive column-select input and an output 128b, which with application of appropriate signals at the column-select inputs, communicates the scaled version of current Icontrol . . . current Icontrol' . . . to pixel 130.

Pixel 130 includes n-channel mosfets 131, 132, 133, and 134, a capacitor 135, and an emitter resistor 136. Mosfets 131 and 133 have channels with an exemplary ratio of 10:2; mosfets 132 and 134 have channels with respective ratios of 10:20 and 7:5. Drain 131, which serves as an input of pixel 130, connects to output 128b of transmission gate 128 to receive current Icontrol'. Gate 131 connects to the row-select input, and source 131 connects to gate 132, to drain 132, and to source 133. Source 132 connects to ground node 104; gate 133 connects to the row-select input via gate 131. Drain 133 is connected to gate 134 and to a first capacitor node 135a of capacitor 135, which is a one-pico-farad capacitor in the exemplary embodiment. Mosfet 134 has its source connected to a second capacitor node 135b, and ground node 104 and its drain connected to positive supply node 102 via emitter resistor 136.

In specific operation, pixel 130 receives current Icontrol' at drain 131. An active or high voltage at the row-select input, which is connected to gates 131 and 133, turns on mosfets 131 and 133, which function as switches. In response, mosfet 131 conducts current Icontrol' to mosfet 132, a diode-connected transistor, and mosfet 133 couples drain 132 to capacitor node 135a and to gate 134. Mosfet 132 conducts current Icontrol' and produces a corresponding control voltage across capacitor 135. Mosfet 132 and 134 form a current mirror. Thus, mosfet 134, the pixel-control transistor, draws current Icontrol' through emitter resistor 136 which produces a corresponding thermal emission, which is independent of the ground voltage at the pixel. The control voltage across capacitor 135 charges the capacitor, enabling mosfet 134 to continue conducting and resistor 136 to continue emitting for a period of time after deasserting the row-select input.

Notably, the exemplary embodiment includes two current mirror circuits, one within current router 120 and the other within pixel 130. Some other embodiments, however, may use one current mirror circuit, with the input transistor of the current mirror located outside the array and the output transistor, that is, the pixel control transistor located within the array. This alternative arrangement is less desirable than the exemplary embodiment, because it not only entails the lower-precision operation of routing voltages rather than current into the pixel, but also produces thermal emissions that are still dependent on local ground voltage, since the routed voltage is still referenced to ground. Additionally, splitting the input and output transistors of the current mirror introduces a greater degree of mismatching.

FIG. 2 shows an exemplary infrared scene projector 200. Projector 200 includes a scene-generation unit 210, a thermal pixel array 220, and an optic unit 230. Scene-generation unit 210 includes, for example, one or more conventional processors, scene-generation programs, scene-definition files, analog-to-digital converters, and interface and control logic, for producing pixel-array control data 212. In the exemplary embodiment, control data 212 includes one or more pixel addresses and pixel-control voltages for controlling operation of thermal pixel array 220.

Array 220 incorporates one or more teachings of exemplary pixel array 100. In the exemplary embodiment, array 220 includes one or more 128×128 arrays, with each array including eight voltage-to-current converters 110, eight current routers 120, and associated multiplexers to address and route current to 16,384 pixel circuits 130. However, other embodiments include other numbers of smaller or larger arrays. In response to control data 212, array 220 generates a first thermal image in the form of thermal emissions 222. Thermal emissions 222 are transformed via optics unit 230 to an output thermal image in the form of thermal emissions 232.

CONCLUSION

In furtherance of the art, the inventors have presented not only innovative infrared pixel arrays and related control methods, but also an infrared scene projector incorporating them. The exemplary infrared pixel array includes two or more pixels, with each pixel including a resistor and its own current-mirror circuit. A related control method entails receiving a pixel-control voltage, converting the pixel-control voltage to a current, and then coupling the current to the current-mirror circuit in one of the pixels. The current mirror applies an appropriate control current to the resistor and thus enables operation of the pixel independent of ground-voltage variations.

The embodiments described above are intended only to illustrate and teach one or more ways of practicing or implementing the present invention, not to restrict its breadth or scope. The scope of the invention intended to encompass all ways of practicing or implementing the principles of the invention, is defined only by the following claims and their equivalents.

What is claimed is:

1. An infrared scene projector comprising:
   an array of two or more pixel circuits, with each pixel circuit including an infrared emitter and a current mirror coupled to the emitter;
   a voltage-to-current converter having an input node and an output node, with the input node for receiving pixel-control-voltage signals and the output node for outputting a pixel-control current based on the pixel-control-voltage signal; and
   a first current router for routing a current based on the pixel-control current to the current mirror in at least a first one of the pixel circuits.

2. The projector of claim 1, wherein the infrared emitter comprises a resistor.

3. The projector of claim 1, wherein the current mirror in each pixel circuit comprises:
a pixel transistor having a control node and a pair of controlled nodes, with a first one of the controlled nodes coupled to the infrared emitter; and
another transistor coupled to the pixel transistor.

4. The projector of claim 3, wherein each pixel circuit further includes:
a capacitor coupled across the control node and a second one of the controlled nodes.

5. The projector of claim 1, wherein the voltage-to-current converter comprises a pair of field-effect transistors coupled in parallel, with each field-effect transistor having a gate coupled to the input node of the converter.

6. The projector of claim 1, the first current router includes a first current mirror circuit selectively couplable to the current mirror circuit in the first one of the pixel circuits.

7. The projector of claim 1, further including a second current router coupled between the voltage-to-current converter and a second one of the pixel circuits.

8. An infrared scene projector comprising:
an array of two or more pixel circuits, with each pixel including an infrared emitter and a current mirror coupled to the emitter; and
a first current router for routing a current based on a pixel-control voltage signal to the current mirror in at least a first one of the pixel circuits.

9. The projector of claim 8, wherein the infrared emitter comprises a resistor.

10. The projector of claim 8, the first current router includes a first current mirror circuit selectively couplable to the current mirror circuit in the first one of the pixel circuits.

11. The projector of claim 8, wherein the first current mirror comprises three field-effect transistors.

12. The projector of claim 8, further including a second current router coupled between the voltage-to-current converter and a second one of the pixel circuits.

13. The projector of claim 8, further comprising a voltage-to-current converter having an input node and an output node, with the input node for receiving pixel-control-voltage signals and the output node for outputting a pixel-control current based on the pixel-control-voltage signal to the first current router.

14. An infrared scene projector comprising:
a voltage-to-current converter having an input node and an output node, with the input node for receiving pixel-control-voltage signals and the output node for outputting a pixel-control current based on the pixel-control-voltage signal; and
an array of two or more pixel circuits, with each pixel including:
an infrared emitter; and
a current mirror couplable to the output node of the voltage-to-current converter.

15. The projector of claim 14, wherein the current mirror in each pixel circuit comprises:
a pixel transistor having a control node and a pair of controlled nodes, with a first one of the controlled nodes coupled to the infrared emitter; and
another transistor coupled to the pixel transistor.

16. The projector of claim 14, wherein each pixel circuit further includes:
a capacitor coupled across the control node and a second one of the controlled nodes.

17. The projector of claim 14, further comprising:
a first current router coupled between the voltage-to-current converter and the current mirror in at least a first one of the pixel circuits.

18. The projector of claim 14, further including a second current router coupled between the voltage-to-current converter and a second one of the pixel circuits.

19. An infrared scene projector comprising:
an array of two or more pixel circuits, with each pixel circuit including an infrared emitter;
a voltage-to-current converter having an input node and an output node, with the input node for receiving pixel-control-voltage signals and the output node for outputting a pixel-control current based on the pixel-control-voltage signal; and
a first current router for routing a current based on the pixel-control current to at least a first one of the pixel circuits.

20. The projector of claim 19, wherein each pixel includes an infrared emitter and a current mirror coupled to the emitter.

21. The projector of claim 19, wherein the voltage-to-current converter comprises a pair of field-effect transistors coupled in parallel, with each field-effect transistor having a gate coupled to the input node of the converter.

22. The projector of claim 19, wherein the first current router includes a first current mirror circuit selectively couplable to the current mirror circuit in the first one of the pixel circuits.

23. The projector of claim 22, wherein the first current mirror comprises three field-effect transistors.

24. An infrared scene projector comprising:
an array of two or more pixel circuits, with each pixel including an infrared emitter; and
one or more current mirrors coupled to the infrared emitter of each of the pixel circuits.

25. The projector of claim 24, wherein each pixel circuit includes a pixel transistor having a control node and a pair of controlled nodes, with a first one of the controlled nodes coupled to the infrared emitter; and
wherein at least one of the current mirror comprises the pixel transistor of one of the pixel circuits and another transistor coupled to the pixel transistor.

26. The projector of claim 24, wherein the other transistor is within the pixel circuit.

27. The projector of claim 24, wherein the other transistor is outside the pixel circuit.

28. The projector of claim 24, further comprising a first current router for routing a current to one or more of the current mirrors.

29. An infrared scene projector comprising:
an input node for receiving voltage control signals;
a voltage-to-current converter circuit for converting received voltage control signals to a control current;
an array of infrared pixel circuits, each pixel circuit comprising an infrared emitter and a current-mirror circuit; and
means for routing the control current to the current mirror circuit in one of the pixel circuits.

30. An infrared scene projector comprising:
first and second supply nodes;
an array of two or more pixel circuits, with each pixel circuit comprising:
an infrared emitter having first and second emitter nodes, with the first emitter node coupled to the first supply node;

a pixel control transistor having a pixel control node and a pair of pixel controlled nodes, with the pair of controlled nodes coupled between the second emitter node and the second supply node;

a capacitor having first and second capacitor nodes, the first capacitor nodes coupled to the pixel control node and the second capacitor node coupled to one of the pixel controlled nodes;

first, second, and third transistors having respective first, second, and third control nodes and respective first, second, and third pairs of controlled nodes, with one of the first pair of controlled nodes coupled to the second capacitor node and one of the second pair of controlled nodes coupled to the first capacitor node, with the first control node coupled to the other of the first pair of controlled nodes, to the other of the second pair of controlled nodes, and to one of the third pair of controlled nodes, and with the second control node coupled the third control node; and a voltage-current-converter having an input and an output, with the output coupled to the other of the third pair of controlled nodes; and an input node for receiving pixel control voltages, the input node coupled to the input of the voltage-to-current converter.

31. A method for transferring or handling pixel-intensity signals in an infrared pixel array, the method comprising:

converting a pixel control voltage to a control current outside a pixel circuit;

routing a current based on the control current to the pixel circuit; and applying a current based on the routed current to an infrared emitter in the pixel circuit.

32. The method of claim 31, wherein routing the current based on the control current to the pixel circuit comprises:

selecting the pixel circuit; and mirroring the current to the pixel circuit in response to selecting the pixel circuit.

33. The method of claim 31, further comprising converting the routed current to a voltage across a pixel control transistor.

34. The method of claim 31, wherein converting the routed current to the pixel control voltage comprises charging a capacitor coupled to a gate of the pixel control transistor.

35. The method of claim 31, wherein applying the current based on the routed current comprises applying the current based on the routed current to two or more pixel circuits concurrently.

36. A method for transferring or handling pixel-intensity signals in an infrared pixel array, the method comprising:

converting a pixel control voltage to a control current outside a pixel circuit;

routing a current based on the control current to the pixel circuit; and applying a current based on the routed current to an infrared emitter in the pixel circuit; and wherein routing the current to the pixel circuit comprises:
selecting the pixel circuit; and
mirroring the current to the pixel circuit in response to selecting the pixel circuit.

37. A method for transferring or handling pixel intensity signals in an infrared pixel array, the method comprising:

converting a pixel control voltage to a control current outside a pixel circuit;

routing a current based on the control current to the pixel circuit; and applying a current based on the routed current to an infrared emitter wherein converting the routed current to the pixel control voltage comprises
charging a capacitor coupled to a gate of the pixel control transistor.

* * * * *